(12) United States Patent
Kimura et al.

(10) Patent No.: US 11,343,181 B2
(45) Date of Patent: May 24, 2022

(54) COMMON CARRIER NETWORK DEVICE, NETWORK SYSTEM, AND PROGRAM

(71) Applicant: Nippon Telegraph and Telephone Corporation, Tokyo (JP)

(72) Inventors: Hideaki Kimura, Tokyo (JP); Gou Yazawa, Tokyo (JP); Akihiro Morita, Tokyo (JP); Erina Takeshita, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 16/964,497

(22) PCT Filed: Feb. 7, 2019

(86) PCT No.: PCT/JP2019/004496
§ 371 (c)(1),
(2) Date: Jul. 23, 2020

(87) PCT Pub. No.: WO2019/156188
PCT Pub. Date: Aug. 15, 2019

(65) Prior Publication Data
US 2021/0036954 A1 Feb. 4, 2021

(30) Foreign Application Priority Data
Feb. 8, 2018 (JP) .............................. JP2018-020605

(51) Int. Cl.
*H04L 45/00* (2022.01)
*H04L 12/46* (2006.01)
*H04L 45/28* (2022.01)

(52) U.S. Cl.
CPC .......... *H04L 45/66* (2013.01); *H04L 12/4641* (2013.01); *H04L 45/22* (2013.01); *H04L 45/28* (2013.01)

(58) Field of Classification Search
None
See application file for complete search history.

(56) References Cited

U.S. PATENT DOCUMENTS

2009/0010182 A1* 1/2009 Tochio .................... H04L 45/50
370/254
2012/0033665 A1 2/2012 Da Silva et al.
(Continued)

FOREIGN PATENT DOCUMENTS

JP 2013-535922 9/2013
JP 2015-508631 3/2015
JP 2015-211402 11/2015

OTHER PUBLICATIONS

Netone.co.jp, [online], "Changing with EVPN Data Center Networks with EVPN (3)," Mar. 25, 2016, retrieved on Dec. 28, 2017, retrieved from URL<http://www.netone.com.jp/report/column/column1/20160318.html>, 12 pages (with Machine Translation).
(Continued)

*Primary Examiner* — Christine T Duong
(74) *Attorney, Agent, or Firm* — Fish & Richardson P.C.

(57) ABSTRACT

An object of the present disclosure is to provide a provider network device, a network system, and a program that shorten a communication disconnection time during redundancy switching in a Single-Active redundant configuration. The provider network device according to the present disclosure notifies a CE that a VLAN, which has been communicating with traffic, is disabled due to setting of a block point or that new traffic communication is enabled due to releasing of the block point. This allows the CE to quickly delete a previously used transfer database and build up a new transfer database, and thus it is possible to shorten a communication disconnection time during redundancy switching.

18 Claims, 6 Drawing Sheets

(56) References Cited

U.S. PATENT DOCUMENTS

2013/0194911 A1* 8/2013 Fedyk ................ H04L 43/0811
370/217
2015/0312121 A1 10/2015 Yasuda et al.
2018/0091445 A1* 3/2018 Singh ...................... H04L 45/66

OTHER PUBLICATIONS

Sajassi et al., "BGP MPLS-Based Ethernet VPN," Internet Engineering Task Force (IETF), Feb. 2015, 56 pages.

* cited by examiner

COMMON CARRIER NETWORK DEVICE, NETWORK SYSTEM, AND PROGRAM

CROSS-REFERENCE TO RELATED APPLICATIONS

This application is a National Stage application under 35 U.S.C. § 371 of International Application No. PCT/JP2019/004496, having an International Filing Date of Feb. 7, 2019, which claims priority to Japanese Application Serial No. 2018-020605, filed on Feb. 8, 2018. The disclosure of the prior application is considered part of the disclosure of this application, and is incorporated in its entirety into this application

TECHNICAL FIELD

The present disclosure relates to a provider network device, a network system, and a program that can shorten a communication disconnection time accompanying setting and releasing of a block point to a logical port.

BACKGROUND ART

In a known Layer 2 Virtual Private Network (L2VPN) using Ethernet (trade name), a control function and a data transfer function are integrated, and a transfer path is decided based on MAC address learning. This causes information deletion from a MAC address table for MAC address relearning and a large amount of flooding at the time of switching the path. As a result, there may be pressure on a communication band.

As a means to solve the problems in L2VPN, an Ethernet (trade name) VPN (EVPN) has been proposed in RFC7432 (for example, refer to Non-Patent Literature 1). In EVPN, the control function (C-plane) is separated from the data transfer function (D-plane), and thus the MAC address learning is replaced by MAC address informing. The flooding itself cannot be eliminated, but there is an advantage that it is possible to suppress the occurrence of a large amount of flooding at the time of switching the path. With the separation of the control function and the data transfer function and concentrated management of the control function, it is easy to reduce device costs and automate control.

In EVPN, there are features such as Multi-home redundancy realization, L2/L3 service integration, data transfer function selectability according to usage, and high fault tolerance, in addition to the separation of the control function and the data transfer function.

Here, the Multi-home redundancy refers to a redundant configuration between a plurality of provider edge devices (PE) and customer edge devices (CE). A type in which all the PEs are communicable with the CE is referred to as an All-Active (Active-Active, especially in a case where there are two PEs) type, and a type in which only one specific PE is communicable with the CE at a certain point in time is referred to as a Single-Active (Active-Standby, especially in a case where there are two PEs) type. The All-Active type needs a Link AGgregation (LAG) setting for the CE in terms of L2 loop prevention. On the other hand, a LAG function for the CE is not needed in the Single-Active type.

In EVPN, an All-Active redundant configuration and a Single-Active redundant configuration may be set. The Single-Active redundant configuration of the configurations is defined as "a configuration in which only a single PE of all the PEs connected with an Ethernet (trade name) segment allows communication between a transfer network and the Ethernet (trade name) segment".

CITATION LIST

Non-Patent Literature

Non-Patent Literature 1: RFC7432: BGP MPLS-Based Ethernet VPN, tools.ietf.org/html/rfc7432 (searched on Jan. 26, 2018)

Non-Patent Literature 2: Data center network 3 that changes with or is changed by EVPN, www.netone.co.jp/report/column/column1/20160318.html (searched on Jan. 26, 2018)

SUMMARY OF THE INVENTION

Technical Problem

In the Single-Active redundant configuration, only a single PE allows communication between the transfer network and the Ethernet (trade name) segment. That is, when a frame is transmitted from the CE to the PE, the CE cannot be communicated with another CE through the transfer network unless the frame is transmitted to the only PE that allows communication between the transfer network and the Ethernet (trade name) segment. In a case where a fault occurs in the transfer network and the only PE that allows communication between the transfer network and the Ethernet (trade name) segment is changed, the path switching is needed such that the CE transmits the frame to the only PE that allows communication between the transfer network and the Ethernet (trade name) segment after the change.

In the related art, even in a case where each PE shortens times required for the block point setting and the block point releasing based on information, such as a fault, exchanged in a network information exchange unit of the PE, the CE is not notified of position change information of the block point. Thus, there has been a problem in that a transfer database of the CE cannot be deleted and a time during which traffic in a direction from the CE to the PE is not communicable increases (for example, refer to Non-Patent Literature 2).

The redundancy in the Single-Active type will be described using FIG. 1. In EVPN, an information exchange relating to an Ethernet (trade name) segment and a MAC address is performed between respective PEs through an EVPN network by using a Multi Protocol-Border Gateway Protocol (MP-BGP).

In the case of the Single-Active type, the plurality of PEs and CEs are connected on a VLAN network side, but a path communicable from the PE side to the CE side is uniquely decided for each VLAN. In the example of FIG. 1, the communication is possible for VLANs #1 and #n only from PE #2 and for VLAN #2 only from PE #1, and blocking is set to VLANs #1 and #n for PE #1 and to VLAN #2 for PE #2. A communicable path between PE #1, PE #2, and CE #1 may be set for each VLAN by using a Spanning Tree Protocol (STP).

FIG. 2 describes an operation when a blocking position is changed, such as a case where a fault occurs on the EVPN network side. In FIG. 2, the blocking set to VLAN #2 for PE #2 is released and blocking to VLAN #2 for PE #1 is newly set for some reason. For example, in a case where a fault occurs in a transfer network side port of PE #1 and the frame cannot be transmitted from PE #1 to the transfer network side, the operation is expected.

Here, PE #1 does not explicitly notify CE #1 that VLAN #2 is blocked. This causes CE #1 to perform communication through PE #1 continuously when the frame is transmitted to CE #2. On the other hand, paths from PE #1 to PE #3 and CE #2 are in an unavailable state. As a result, the communication from CE #1 to CE #2 is not established.

The use of the STP between PE #1, PE #2, and CE #1 allows CE #1 to notice a block point change while the STP is known to be a relatively slow protocol and elimination of a MAC address learning table of CE #1 takes time. Thus, even after the blocking position changes, the MAC table of CE #1 may not be eliminated, and the frame may be transmitted continuously from a port connected directly to PE #1. As a result, a communication disconnection state in a direction from CE #1 to CE #2 continues for a certain time to transmit the frame from CE #1 to the PE where the block point is set.

In other words, even when the blocking position change between PEs #1 and #2 is performed in a short time, there has been a problem in that the time to eliminate the MAC address learning table of CE #1 is extended and a time during which traffic is not communicable increases (for example, refer to Non-Patent Literature 1).

The present disclosure has been made focusing on the above circumstances, and an object of the present disclosure is to provide a provider network device, a network system, and a program that shorten a communication disconnection time during redundancy switching in a Single-Active redundant configuration.

Means for Solving the Problem

In order to achieve the above object, provider network devices (PE) according to the present disclosure exchange information with each other through a transfer network and transmit information relating to block point setting or releasing to a CE when a block point for the CE is changed based on the information.

Specifically, a provider network device for connecting a transfer network and a customer network device, the provider network device including: a redundancy mechanism configured to realize a redundant configuration between the transfer network and the customer network device together with at least one other provider network device, and in which a block point is designated at a logical port so that only one of the provider network devices transmits and receives frames to and from the customer network device, wherein the redundancy mechanism includes a network information exchange unit configured to exchange information relating to communication with the other provider network device through the transfer network; a block point deciding unit configured to decide a change in setting or releasing of the block point with respect to the logical port based on the information exchanged through the network information exchange unit; and a block point change information notification unit configured to cause the customer network device to recognize that the block point is changed with respect to the customer network device, with the block point deciding unit deciding the change of the block point as a trigger.

A network system including:
at least two provider network devices; and
the customer network device,
wherein the customer network device performs information elimination in which information of a transfer path through which transfer is not allowed due to the change of the block point is eliminated from a transfer database that stores a transfer path to the transfer network in a case where the change of the block point is that "block point is newly set"; and
information update in which information of a transfer path being changed due to a change in setting of the block point is rewritten to the transfer database in a case where the change of the block point is that "block point is released".

The PE notifies the CE that a VLAN, which has been communicating with traffic, is disabled due to setting of a block point or that new traffic communication is enabled due to releasing of the block point. This allows the CE to quickly delete a previously used transfer database and build up a new transfer database, and thus it is possible to shorten a communication disconnection time during redundancy switching. Thus, the present disclosure can provide the provider network device and the network system that shorten the communication disconnection time during redundancy switching in a Single-Active redundant configuration.

In the provider network device according to the present disclosure, in a case where the change of the block point is that "block point is newly set", the block point change information notification unit performs notification of the change of the block point by using a transmission path including the logical port for which the block point is newly set.

For example, the block point change information notification unit of the provider network device according to the present disclosure performs notification of the change of the block point by Ethernet (trade name) OAM.

For example, the block point change information notification unit of the provider network device according to the present disclosure blocks a physical port of the transmission path including the logical port for which the block point is newly set to perform notification of the block point change.

In the provider network device according to the present disclosure, in a case where the change of the block point is that "block point is released", the block point change information notification unit performs notification of the change of the block point by using a transmission path including the logical port for which the block point is released.

For example, the network information exchange unit of the provider network device according to the present disclosure acquires a list of MAC addresses that are communicable through the transfer network, and the block point change information notification unit transmits a frame having the MAC address included in the list as a transmission source to the customer network device to perform notification of the block point change.

A program according to the present disclosure is a program for causing a computer to function as the provider network device.

Effects of the Invention

The present disclosure can provide the provider network device, the network system, and the program that shorten the communication disconnection time during redundancy switching in a Single-Active redundant configuration.

DESCRIPTION OF EMBODIMENTS

Figure 1:
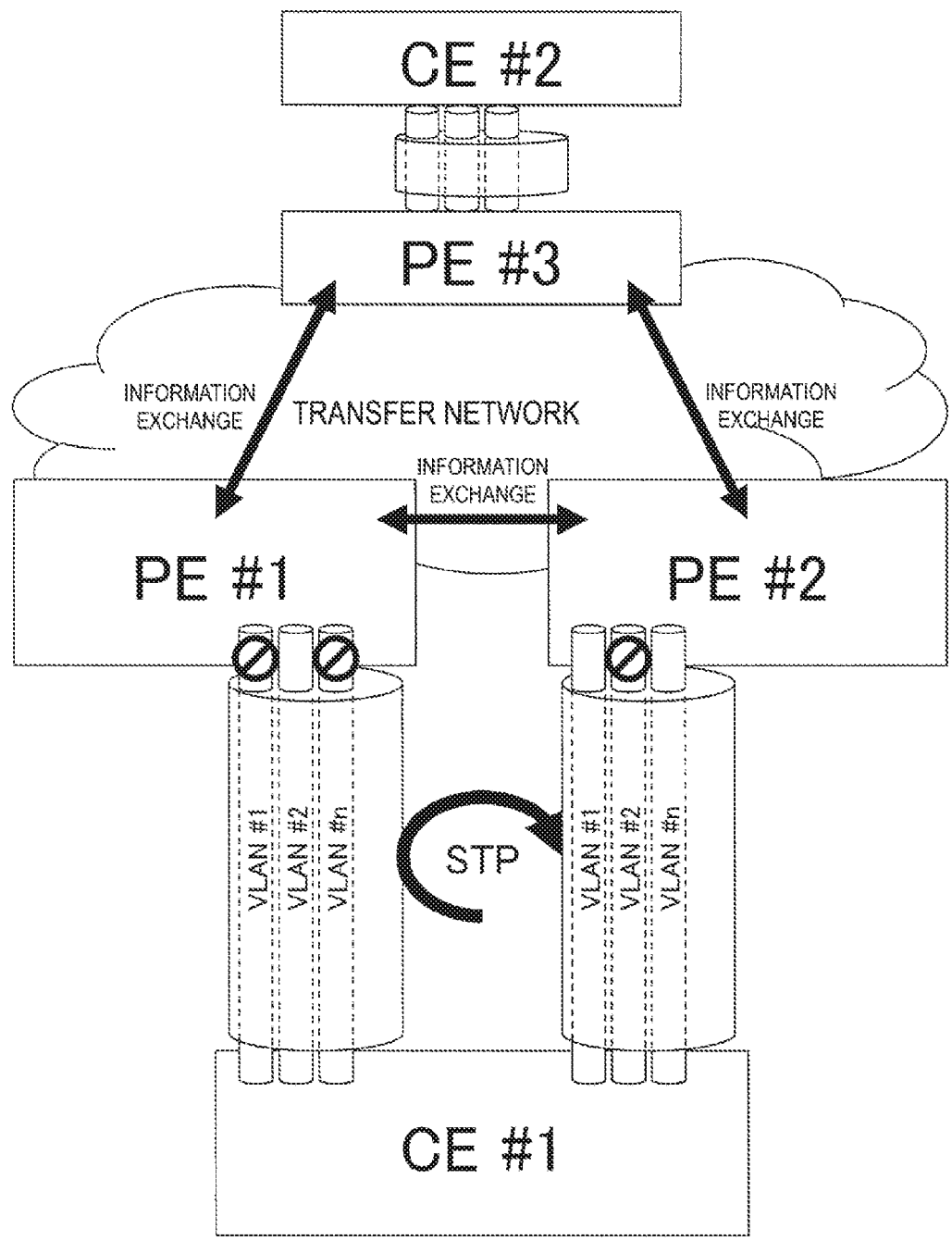
FIG. 1 is a diagram illustrating a network system including a provider network device (PE) and a customer network device (CE).
Figure 2:
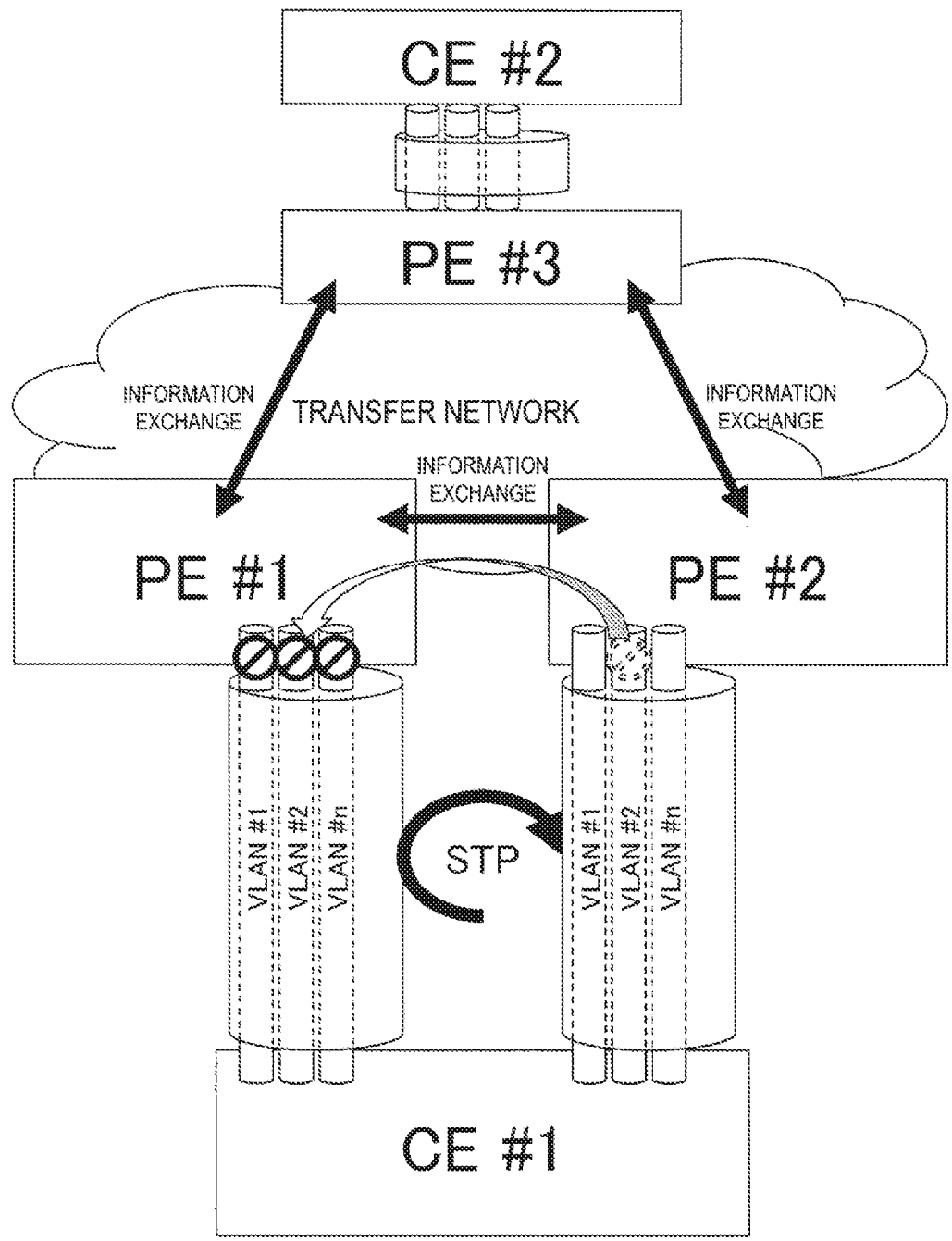
FIG. 2 is a diagram illustrating an operation of changing a communication path according to setting or releasing of a block point in the network system including the provider network device (PE) and the customer network device (CE).

Embodiments of the present disclosure will be described with reference to accompanying drawings. The embodiments described below are examples of the present disclosure, and the present disclosure is not limited to the following embodiments. Note that components having the same reference signs in the present specification and the drawings indicate the same components.

Network System Outline

A provider network device according to the embodiment is a provider network device for connecting a transfer network and a customer network device, and realizes a redundant configuration between the transfer network and the customer network device together with at least one other provider network device. Further, the provider network device includes a redundancy mechanism in which a block point is designated at a logical port so that only one of the provider network devices transmits and receives frames to and from the customer network device. Furthermore, the redundancy mechanism includes the following:
(1) A network informationexchange unit configured to exchange information relating to communication with the other provider network device through the transfer network;
(2) A block point deciding unit configured to decide a change in setting or releasing of the block point with respect to the logical port based on the information exchanged through the network information exchange unit; and
(3) A block point change information notification unit configured to cause the customer network device to recognize that the block point is changed with respect to the customer network device, with the deciding of the block point change performed by the block point deciding unit as a trigger.

A network system according to the embodiment is a network system including at least two provider network devices according to any one of claims 1 to 6 and the customer network device.

Further, the customer network device is configured to perform the following information elimination or information update:

(1) In a case where the change of the block point is that "block point is newly set": Information elimination in which information of a transfer path through which transfer is not allowed due to the change of the block point is eliminated from a transfer database that stores a transfer path to the transfer network; and
(2) In a case where the change of the block point is that "block point is released": Information update in which information of a transfer path being changed due to a change in setting of the block point is rewritten to the transfer database.

A network according to the embodiment includes a block point change information unit in which a plurality of PEs that exchange information with each other through a transfer network transmit information relating to block point setting or releasing from the PE to a CE when a block point is changed with respect to the CE.

This allows the CE to quickly acquire the information relating to the block point setting or releasing after the PE changes the block point and thus information held by a transfer database of CE to be eliminated. As a result, it is possible to shorten a time during which traffic is not communicable.

In a case where a MAC address learning function in an L2 network is used as a control method of the transfer database, there are two methods for eliminating a MAC address learning table which is a transfer database. A first method is a method in which the CE receives information that "communication with a learned. MAC address through the transfer network is disabled" at a port used for traffic communication of a device that holds the MAC address learning table. A second method is a method in which the CE receives information that "communication with a learned MAC address through the transfer network is enabled" at a new port to be used for traffic communication of a device that holds the MAC address learning table.

There is an advantage that both methods can be realized without affecting the technology to support an L2 network root, such as the MAC address learning function. Hereinafter, the first method, the second method, and a combination of the first and second methods will be respectively described below in Embodiments 1, 2, and 3.

Embodiment 1

Figure 3:
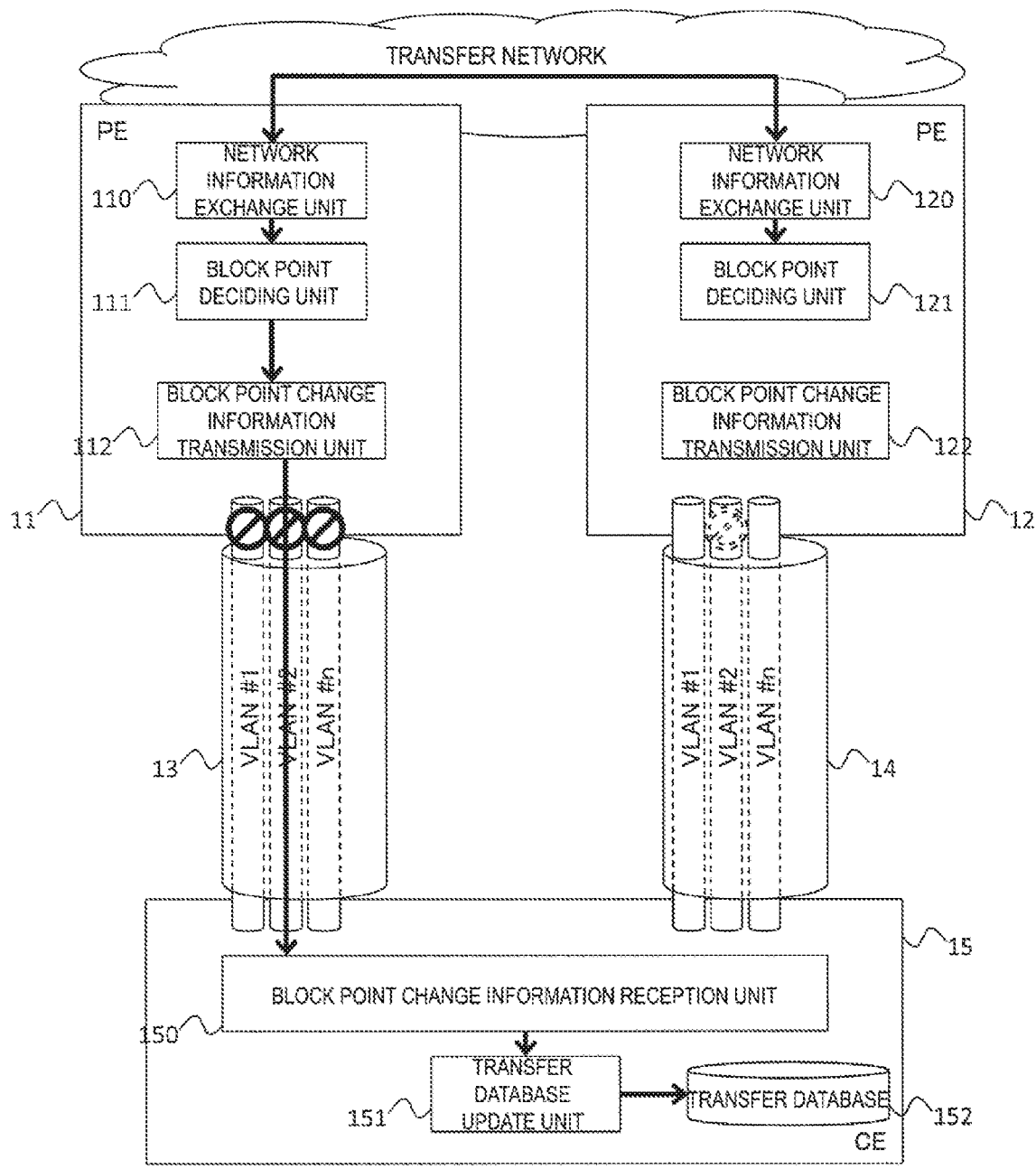
FIG. 3 is a diagram illustrating an operation of realizing redundancy switching in a logical port unit between the PE and the CE in the network system including the provider network device (PE) according to an embodiment of the present disclosure.

FIG. 3 is a diagram illustrating a network system 301 that connects a plurality of PEs and a single CE to realize redundancy between the PE and the CE. In a case where the change of the block point is that "block point is newly set", the block point change information notification unit of the PE in the network system 301 performs notification of the change of the block point by using a transmission path including the logical port for which the block point is newly set.

The network system 301 includes two PEs (11, 12) and one CE 15, a transmission path 13 connecting the PE 11 and the CE 15, and a transmission path 14 connecting the PE 12 and the CE 15. The PE 11 includes a network information exchange unit 110, a block point deciding unit 111, and a block point change information transmission unit 112. The PE 12 includes a network information exchange unit 120, a block point deciding unit 121, and a block point change information transmission unit 122. The CE 15 includes a block point change information reception unit 150, a transfer database update unit 151, and a transfer database 152. A plurality of logical communication paths VLAN #1, #2, . . . , #n are set for the transmission paths 13 and 14.

For example, Multi-home redundancy of an EVPN may be used for the network information exchange unit 1×0 and the block point deciding unit 1×1 (x=1 or 2). That is, the network system 301 performs information exchange relating to an Ethernet (trade name) Segment (ES) through a transfer network by an MP-BGP. In a case of a Single-Active configuration in the Multi-home redundancy, only one port is communicable with the CE and another port is designated as the block point.

The block point is decided based on the information exchanged between the network information exchange unit 110 of the PE 11 and the network information exchange unit 120 of the PE 12 through the transfer network. Here, with the block point change as a trigger, the block point change information transmission unit 112 transmits information including that "block point is newly set" to the CE. In the configuration in which the plurality of PEs and the single CE are connected, only one CE needs to be notified of the information including that "the block point is newly set" for eliminating the MAC address table. Thus, the CE can be notified of the information including that "the block point is newly set" from both the PEs 11 and 12.

In a case where a special function is not required for the CE 15, a technique to maximize a control function for the transfer database of the CE 15 is appropriate. In a case where a MAC address learning function in an L2 network is used as the control function for the transfer database, the CE 15 needs to receive information that "communication with a learned MAC address through the transfer network is disabled" from a port connected with the transmission path 13. That is, with transition from a state where the block point is released to a state where the block point is set in the block point deciding unit 111 of the PE 11 as a trigger, the information including that "block point is newly set" is transmitted from the block point change information transmission unit 112 to the CE 15 through the transmission path 13.

With the reception of the information including that "block point is newly set" in the block point change information reception unit 150 of the CE 15 as a trigger, the transfer database update unit 151 eliminates transfer database information through which transfer from the port is not allowed due to the block point being set from the transfer database 152. In the case where the MAC address learning function in the L2 network is used as the control function for the transfer database, the transfer database update unit 151 determines that communication using a port that receives the information including that "block point is newly set" is disabled and deletes learned information relating to the port. In a case where communication through the transfer network is performed after the learned information has been deleted, the CE 15 is in a MAC address unlearned state and thus floods an Unknown Unicast frame.

In this manner, the transfer database information is eliminated from the transfer database 152 of the CE 15 immediately after the block point has been changed, and thus it is possible to shorten a communication disconnection time in a direction from the CE 15 to the PE and the transfer network.

A method of controlling the transfer database information of the CE 15 in a VLAN unit, that is, in a logical port unit, includes a method using an ETH-CC state change or ETH-RDI. An example of the information including that "block point is newly set" includes a method of using a monitoring frame represented by Ethernet (trade name) OAM. The ETH-Continuous Check (CC function) is set in the VLAN unit, and the monitoring frame is communicated between the block point change information transmission unit 112 of the PE 11 and the block point change information reception unit 150 of the CE 15. In a case where the block point is changed, the logical port is blocked based on a Multi-home redundancy function of the EVPN and the monitoring frame communication of the ETH-CC set for each VLAN stops. In this manner, it is possible to perform the notification of the information including that "block point is newly set" based on the change in the monitoring frame communication by the ETH-CC.

Alternatively, the notification of the information including that "block point is newly set" may be performed by the ETH-Remote Defect Indication (RDI function) defined in the Ethernet (trade name) OAM. That is, the block point change information transmission unit 112 of the PE 11 transmits the ETH-RDI to the block point change information reception unit 150 of the CE 15, with the block point change as a trigger. With the reception of the ETH-RDI by the block point change information reception unit 150 of the CE 15 as a trigger, the transfer database update unit 151 may eliminate the transfer database information through which transfer from the port is not allowed due to the block point being set from the transfer database 152.

Figure 4:
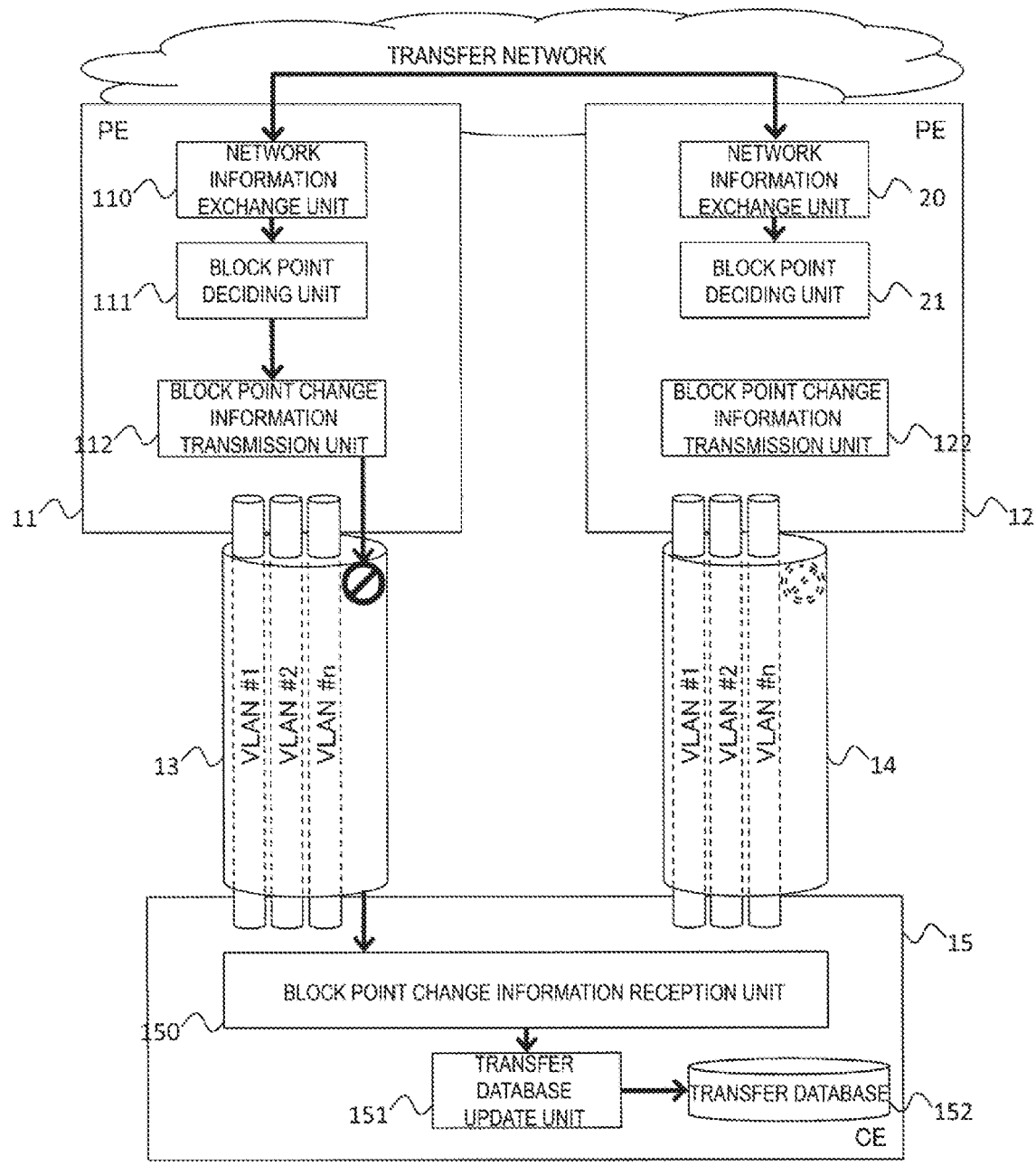
FIG. 4 is a diagram illustrating an operation of realizing redundancy switching in a logical port unit between the PE and the CE in the network system including the provider network device (PE) according to an embodiment of the present disclosure.

On the other hand, there is a method of controlling the transfer database information of the CE 15 in a physical port unit as illustrated in FIG. 4. For example, there is a method in which the block point change information transmission unit 112 of the PE 11 blocks a physical port including the block point, with the block point change as a trigger. In the method of blocking the physical port, the information frame such as the ETH-CC is not needed for the CE 15.

With blocking of a port connected to the PE 11 as a trigger, the transfer database update unit 151 of the CE 15 eliminates the transfer database information through which transfer from the port is not allowed from the port due to the block point being set from the transfer database 152. In the case where the MAC address learning function in the L2 network is used as the control function for the transfer database, the transfer database update unit 151 determines that communication using a port that receives the information including that "block point is newly set" is disabled and deletes learned information relating to the port. In a case where communication through the transfer network is performed after the learned information has been deleted, the CE 15 is in a MAC address unlearned state and thus floods an Unknown Unicast frame.

In the notification of the information including that "block point is newly set" by the method of blocking the physical port, the elimination process is performed from the transfer database not only for the logical port (VLAN) that changes the block point, but also for another logical port. It is only required that a time for blocking the physical port is a time during which the CE 15 can recognize that the physical port of the PE is blocked or the time may be temporary.

Embodiment 2

Figure 5:
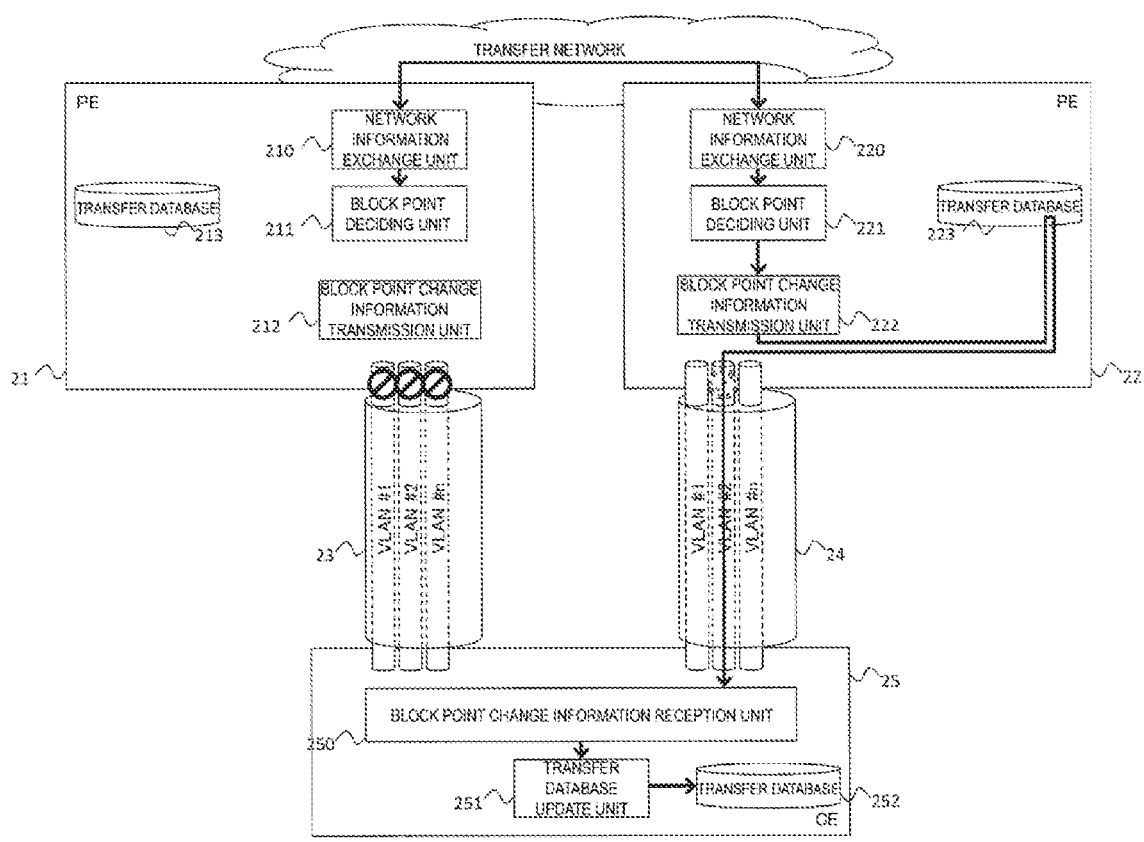
FIG. 5 is a diagram illustrating an operation of realizing redundancy switching in a logical port unit between the PE and the CE in a network system including the provider network device (PE) according to an embodiment of the present disclosure.

FIG. 5 is a diagram illustrating a network system 302 that connects a plurality of PEs and a single CE to realize redundancy between the PE and the CE. In a case where the change of the block point is that "block point is released." the block point change information notification unit of the PE in the network system 302 performs notification of the change of the block point by using a transmission path including the logical port for whiCh the block point is released.

The network system 302 includes two PEs (21, 22) and one CE 25, a transmission path 23 connecting the PE 21 the CE 25, and a transmission path 24 connecting the PE 22 and the CE 25. The PE 21 includes a network information exchange unit 210, a block point deciding unit 211, a block point change information transmission unit 212, and a transfer database 213. The PE 22 includes a network information exchange unit 220, a block point deciding unit 221, a block point change information transmission unit 222, and a transfer database 223. The CE 25 includes a block point change information reception unit 250, a transfer database update unit 251, and a transfer database 252. A plurality of logical communication paths VLAN #1, #2, . . . , #n are set for the transmission paths 23 and 24.

For example, the Multi-home redundancy of the EVPN may be used for the network information exchange unit 2×0 and the block point deciding unit 2×1 (x=1 or 2). That is, the network system 302 performs information exchange relating to the ES through the transfer network by the MP-BGP and stores the information obtained by the information exchange in the transfer database. In a case of a Single-Active configuration in the Multi-home redundancy, only one port is communicable with the CE and another port is designated as the block point.

The block point is decided based on the information exchanged between the network information exchange unit 210 of the PE 21 and the network information exchange unit 220 of the PE 22 through the transfer network. Here, with the block point change as a trigger, the block point change information transmission unit 212 transmits infon ation including that "block point is released" to the CE. In the configuration in which the plurality of PEs and the single CE are connected, only one CE needs to be notified of the information including that "the block point is released" for eliminating the MAC address table. Thus, the CE can be notified of the information including that "the block point is released" from both the PEs 21 and 22.

In a case where a special function is not required for the CE 25, a technique to maximize a control function for the transfer database of the CE 25 is appropriate. In the case where the MAC address learning function in the L2 network is used as the control function for the transfer database, the CE 25 needs to receive information that "communication with a learned MAC address through the transfer network is enabled" from a port connected to the transmission path 24. That is, with transition from a state where the block point is set to a state where the block point is released in the block point deciding unit 221 of the PE 22 as a trigger, the information including that "block point is released" is transmitted from the block point change information transmission unit 222 to the CE 25 through the transmission path 24.

In this manner, the transfer database information in the transfer database 252 of the CE 25 is rewritten immediately after the block point has been changed, and thus it is possible to shorten a communication disconnection time in a direction from the CE 25 to the PE and the transfer network.

In the case where the MAC address learning function in the L2 network is used, the information including that "block point is released" may include information relating to the block point setting and all destination MAC addresses transmitted to the transfer network from the PE 21 prior to the block point release process. In the network using the EVPN, each PE holds the transfer database 223 for the ES and the MAC address. With the release of the block point as a trigger, the PE 22 can determine an ES set for the port and acquire a list of the destination MAC addresses that communicate through the transfer network by referring to the transfer database 223. The PE 22 transmits a frame with the MAC address as a transmission source to the CE 25. This allows MAC address relearning of the CE 25 to be executed and the transfer database 252 to be rewritten.

Embodiment 3

Figure 6:
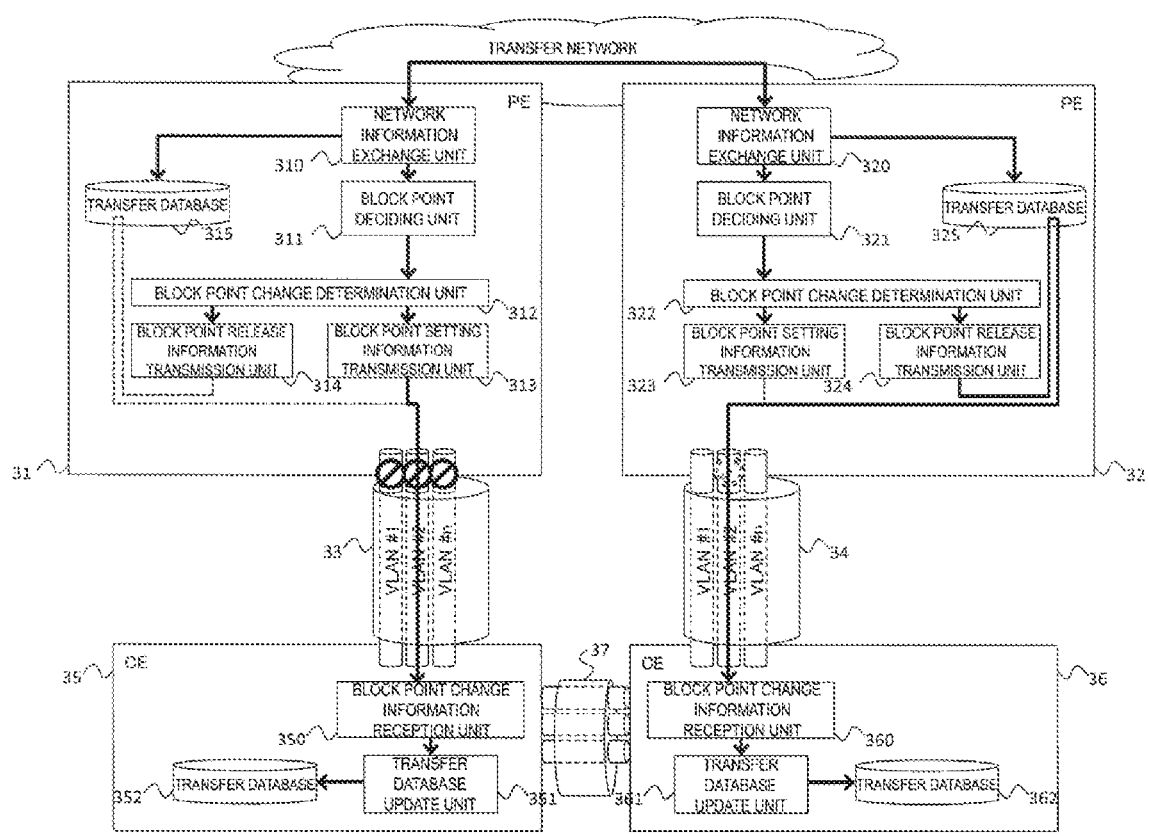
FIG. 6 is a diagram illustrating an operation of realizing redundancy switching in a logical port unit between the PE and the CE in a network system including the provider network device (PE) according to an embodiment of the present disclosure.

FIG. 6 is a diagram illustrating a network system 303 that connects a plurality of PEs and a plurality of CEs to realize redundancy between the PE and the CE.

The network system 303 includes two PEs 31, 32 and two CEs 35, 36, a transmission path 33 connecting the PE 31 and the CE 35, a transmission path 34 connecting the PE 32 and the CE 36, and a transmission path 37 connecting the CEs 35 and 36. The PE 31 includes a network information exchange unit 310, a block point deciding unit 311, a block point change determination unit 312, a block point setting information transmission unit 313, a block point release information transmission unit 314, and a transfer database 315. The PE 32 includes a network information exchange unit 320, a block point deciding unit 321, a block point change determination unit 322, a block point setting information transmission unit 323, a block point release information transmission unit 324, and a transfer database 325. The CE 35 includes a block point change information reception unit 350, a transfer database update unit 351, and a transfer database 352. The CE 36 includes a block point change information reception unit 360, a transfer database update unit 361, and a transfer database 362. A plurality of logical communication paths VLAN #1, #2, . . . , #n are set for the transmission paths 33, 34, and 37.

For example, the Multi-home redundancy of the EVPN may be used for the network information exchange unit 3×0, the block point deciding unit 3×1, and the transfer database 2×5 (x=1 or 2). That is, the network system 303 performs information exchange relating to the ES through the transfer network by the MP-BGP and stores the information obtained by the information exchange in the transfer database. In a case of a Single-Active configuration in the Multi-home redundancy, only one port is communicable with the CE and another port is designated as the block point.

The block point is decided based on the information exchanged between the network information exchange unit 310 of the PE 31 and the network information exchange unit 320 of the PE 32 through the transfer network. Here, with the block point change as a trigger, the block point change determination unit 312 determines which process of "block point is released" and "block point is newly set" is performed on the CE.

In a case where the block point change determination unit 312 of the PE 31 determines that the block point is newly set, the directly connected CE 35 needs to be notified that the block point is newly set.

In a case where a special function is not required for the CE 35, a technique to maximize a control function for the transfer database of the CE 35 is appropriate. In the case where the MAC address learning function in the L2 network is used as the control function for the transfer database, the CE 35 needs to receive the information including that "block point is newly set" from a port which has been communicating before the block point change, and the CE 36 needs to receive information including that "all destination MAC addresses that are in communication with conventional traffic can be communicated with a port that is newly used for traffic communication."

A frame that is not communicable through the transmission path 34 because a block point is set, before the setting for the block point is changed, is transmitted to the transfer network through the CE 36, the transmission path 37, the CE 35, the transmission path 33, and the PE 31. This causes the CE 36 to hold the learning information in the transfer database so as to transmit the frame at a port connected with the transmission path 37. To delete the transfer database information of the CE 36, the information that "communication with a learned MAC address through the transfer network is disabled" needs to be received at the port connected with the transmission path 37. Alternatively, the information that "communication with a learned MAC address through the transfer network is enabled" needs to be received at a port connected with the transmission path 34. Here, a control frame by the port connected with the transmission path 37 of the CE 36 is required to be received through the PE 31, transmission path 33, the CE 35, and transmission path 37. However, the network configuration from the PE side to the CE side is generally unknown in some cases, and functional expansion may be needed for the CE 35 to transmit the control frame through the CE 35. The transfer database information of the CE 36 is deleted by a method such as receiving the information that "communication with a learned MAC address through the transfer network is enabled" at the port connected with the transmission path 34.

That is, with detection by the block point change determination unit 312 of transition from a state where the block point is released to a state where the block point is set in the block point deciding unit 311 of the PE 31 as a trigger, the information including that "block point is newly set" is transmitted from the block point setting information transmission unit 313 to the CE 35 through the transmission path 33. Further, with detection by the block point change determination unit 322 of transition from a state where the block point is set to a state where the block point is released in the block point deciding unit 321 of the PE 32 as a trigger, the information including that "block point is released" is transmitted from the block point change information transmission unit 324 to the CE 35.

With the reception of the information including that "block point is newly set" in the block point change information reception unit 350 of the CE 35 as a trigger, the transfer database update unit 351 eliminates transfer database information through which transfer from the port is not allowed due to the block point being set from the transfer database 352. In the case where the MAC address learning function in the L2 network is used as the control function for the transfer database, the transfer database update unit 351 determines that communication using the port that receives the information including that "block point is newly set" is disabled and deletes learned information relating to the port. In a case where communication through the transfer network is performed after the learned information has been deleted, the CE 15 is in a MAC address unlearned state and thus floods an Unknown Unicast frame.

An example of the information including that "block point is newly set" includes a method of using a monitoring frame represented by the Ethernet (trade name) OAM or a method of using physical port blocking. In a case where the Ethernet (trade name) OAM is used, there is a method of triggering ETH-CC disconnection and a method of triggering notification by the ETH-RDI.

The information including that "block point is released" may include information relating to the block point setting and all destination MAC addresses transmitted to the transfer network from the PE 31 prior to the block point release process. In the network using the EVPN, each PE holds the transfer database 325 for the ES and the MAC address. With the release of the block point as a trigger, the PE 32 can determine an ES set for the port and acquire a list of the destination MAC addresses that communicate through the transfer network by referring to the transfer database 325. The PE 32 transmits a frame with the MAC address as a transmission source to the CE 35 based on the acquired MAC address list. This allows MAC address relearning of the CE 35 to be executed and the transfer database 362 to be rewritten.

Effect

In the embodiments described above, when a block point with respect to a CE is changed, a plurality of PEs transmitting and receiving frames to each other through a transfer network notify the CE of information including that "block point is newly set" or "block point is released". Consequently, it is possible to shorten a communication disconnection time accompanying setting and releasing of the block point between the PE and the CE.

INDUSTRIAL APPLICABILITY

The provider network device and the network system according to the present disclosure can be adapted to an information communication industry. It is possible to realize the provider network device according to the present disclosure by a computer and a program, and to record the program in a recording medium or provide the program through a network.

REFERENCE SIGNS LIST 11, 21, 31: Provider network device (PE)
12, 22, 32: Provider network device (PE)
13, 23, 33: Transmission path
14, 24, 34: Transmission path
15, 25, 35, 36: Customer network device (CE)
37: Transmission path
110, 210, 310: Network information exchange unit
120, 220, 320: Network information exchange unit
111, 211, 311: Block point deciding unit
121, 221, 321: Block point deciding unit
112, 212: Block point change information transmission unit
122, 222: Block point change intbrmation transmission unit
213, 223, 315, 325: Transfer database
312, 322: Block point change determination unit
313, 323: Block point setting information transmission unit
314, 324: BloCk point release information transmission unit
150, 250, 350, 360: Block point change information reception unit
151, 251, 351, 361: Transfer database update unit
152, 252, 352, 362: Transfer database
301, 302, 303: Network system

The invention claimed is:

1. A provider network device for connecting a transfer network and a plurality of customer network devices, the provider network device comprising:
a redundancy mechanism that is implemented in one or more computing devices and that is configured to realize a redundant configuration between the transfer network and the plurality of customer network devices together with at least one other provider network device, and in which a block point is designated at a first logical port so that only one of the provider network devices transmits and receives frames to and from the plurality of customer network devices, wherein the redundancy mechanism includes:
  a network information exchange unit configured to exchange information relating to communication with the other provider network device through the transfer network;
  a block point deciding unit configured to decide a change in setting or releasing of the block point with respect to the first logical port based on the information exchanged through the network information exchange unit; and
  a block point change information notification unit configured to cause a first device among the plurality of customer network devices that is connected to the provider network device to recognize that the block point is changed with respect to the first device, with the block point deciding unit deciding the change of the block point as a trigger,
  wherein a frame that is not communicable through a second logical port connecting the other provider network to a second device among the plurality of customer network devices is transmitted to the transfer network using a first transmission path connecting the first device to the second device through (i) the second device, (ii) the first transmission path, (iii) the first device, (iv) the first logical port, and (v) the provider network device that causes the second device to hold learning information so as to transmit the frame at a port connected to the first transmission path.

2. The provider network device according to claim 1, wherein in a case where the change of the block point is that "block point is newly set", the block point change information notification unit performs notification of the change of the block point by using a second transmission path including the first logical port for which the block point is newly set.

3. The provider network device according to claim 2, wherein the block point change information notification unit performs notification of the change of the block point by Ethernet (trade name) OAM.

4. The provider network device according to claim 2, wherein the block point change information notification unit blocks a physical port of the second transmission path including the first logical port for which the block point is newly set to perform notification of the change of the block point.

5. The provider network device according to claim 1, wherein in a case where the change of the block point is that "block point is released", the block point change information notification unit performs notification of the change of the block point by using a second transmission path including the first logical port for which the block point is released.

6. The provider network device according to claim 5, wherein:
  the network information exchange unit acquires a list of MAC addresses that are communicable through the transfer network; and
  the block point change information notification unit transmits a frame having the MAC address included in the list as a transmission source to the first device to perform notification of the change of the block point.

7. A network system comprising:
a transfer network;
at least two provider network devices; and
at least two customer network devices that are connected by a first transmission path,
wherein each of the at least two customer network devices performs:
  information elimination in which information of a transfer path through which transfer is not allowed due to a change of a block point is eliminated from a transfer database that stores a transfer path to the transfer network in a case where the change of the block point is that "block point is newly set"; and
  information update in which information of a transfer path being changed due to a change in setting of the block point is rewritten to the transfer database in a case where the change of the block point is that "block point is released", and
wherein a first provider network device of the at least two provider network devices comprises:
  a redundancy mechanism that is implemented in one or more compute devices and that is configured to realize a redundant configuration between the transfer network and the at least two customer network devices together with at least one other provider network device, and in which a block point is designated at a first logical port so that only one of the provider network devices transmits and receives frames to and from the at least two customer network devices, wherein the redundancy mechanism includes:
    a network information exchange unit configured to exchange information relating to communication with the other provider network device through the transfer network;
    a block point deciding unit configured to decide a change in setting or releasing of the block point with respect to the first logical port based on the information exchanged through the network information exchange unit; and
    a block point change information notification unit configured to cause a first device among the at least two customer network devices that is connected to the provider network device to recognize that the block point is changed with respect to the first device, with the block point deciding unit deciding the change of the block point as a trigger,
    wherein a frame that is not communicable through a second logical port connecting the other provider network to a second device among the at least two customer network devices is transmitted to the transfer network using the first transmission path through (i) the second device, (ii) the first transmission path, (iii) the first device, (iv) the first logical port, and (v) the provider network device that causes the second device to hold learning information so as to transmit the frame at a port connected to the first transmission path.

8. A non-transitory computer medium having stored thereon a program that causes a computer to function as a provider network device for connecting a transfer network and a plurality of customer network devices, the provider network device comprising:
  a redundancy mechanism configured to realize a redundant configuration between the transfer network and the plurality of customer network devices together with at least one other provider network device, and in which a block point is designated at a first logical port so that only one of the provider network devices transmits and receives frames to and from the plurality of customer network devices, wherein the redundancy mechanism includes:
- a network information exchange unit configured to exchange information relating to communication with the other provider network device through the transfer network;
- a block point deciding unit configured to decide a change in setting or releasing of the block point with respect to the first logical port based on the information exchanged through the network information exchange unit; and
- a block point change information notification unit configured to cause a first device among the plurality of customer network devices that is connected to the provider network device to recognize that the block point is changed with respect to the first device, with the block point deciding unit deciding the change of the block point as a trigger,
- wherein a frame that is not communicable through a second logical port connecting the other provider network to a second device among the plurality of customer network devices is transmitted to the transfer network using a first transmission path connecting the first device to the second device through (i) the second device, (ii) the first transmission path, (iii) the first device, (iv) the first logical port, and (v) the provider network device that causes the second device to hold learning information so as to transmit the frame at a port connected to the first transmission path.

9. The non-transitory computer medium according to claim 8, wherein in a case where the change of the block point is that "block point is newly set", the block point change information notification unit performs notification of the change of the block point by using a second transmission path including the first logical port for which the block point is newly set.

10. The non-transitory computer medium according to claim 9, wherein the block point change information notification unit performs notification of the change of the block point by Ethernet (trade name) OAM.

11. The non-transitory computer medium according to claim 9, wherein the block point change information notification unit blocks a physical port of the second transmission path including the first logical port for which the block point is newly set to perform notification of the change of the block point.

12. The non-transitory computer medium according to claim 8, wherein in a case where the change of the block point is that "block point is released", the block point change information notification unit performs notification of the change of the block point by using a second transmission path including the first logical port for which the block point is released.

13. The non-transitory computer medium according to claim 12, wherein:
- the network information exchange unit acquires a list of MAC addresses that are communicable through the transfer network; and
- the block point change information notification unit transmits a frame having the MAC address included in the list as a transmission source to the first device to perform notification of the change of the block point.

14. The network system according to claim 7, wherein in a case where the change of the block point is that "block point is newly set", the block point change information notification unit performs notification of the change of the block point by using a second transmission path including the first logical port for which the block point is newly set.

15. The network system according to claim 14, wherein the block point change information notification unit performs notification of the change of the block point by Ethernet (trade name) OAM.

16. The network system according to claim 14, wherein the block point change information notification unit blocks a physical port of the second transmission path including the first logical port for which the block point is newly set to perform notification of the change of the block point.

17. The network system according to claim 7, wherein in a case where the change of the block point is that "block point is released", the block point change information notification unit performs notification of the change of the block point by using a second transmission path including the first logical port for which the block point is released.

18. The network system according to claim 17, wherein:
- the network information exchange unit acquires a list of MAC addresses that are communicable through the transfer network; and
- the block point change information notification unit transmits a frame having the MAC address included in the list as a transmission source to the first device to perform notification of the change of the block point.

* * * * *